US008305689B2

(12) United States Patent
Kakui et al.

(10) Patent No.: US 8,305,689 B2
(45) Date of Patent: Nov. 6, 2012

(54) LIGHT SOURCE APPARATUS AND OPTICAL MODULE INCLUDED THEREIN

(75) Inventors: Motoki Kakui, Yokohama (JP); Kazuo Nakamae, Yokohama (JP); Shinobu Tamaoki, Yokohama (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 363 days.

(21) Appl. No.: 12/248,472

(22) Filed: Oct. 9, 2008

(65) Prior Publication Data
US 2009/0091839 A1 Apr. 9, 2009

(30) Foreign Application Priority Data

Oct. 9, 2007 (JP) ................................. 2007-263630

(51) Int. Cl.
*G02B 27/10* (2006.01)
*G02B 26/00* (2006.01)
*G02F 1/03* (2006.01)
(52) U.S. Cl. .......................... 359/618; 359/237; 359/256
(58) Field of Classification Search .................. 359/618, 359/256, 494–500, 290–291, 298, 649, 242, 359/257, 247, 245, 237, 501, 20, 19, 619
See application file for complete search history.

(56) References Cited

U.S. PATENT DOCUMENTS

| | | | |
|---|---|---|---|
| 3,329,474 A * | 7/1967 | Harris et al. ................... | 359/303 |
| 3,594,583 A * | 7/1971 | Sheldon .......................... | 250/210 |
| 4,548,478 A | 10/1985 | Shirasaki | |
| 5,055,652 A | 10/1991 | Jones et al. | |
| 5,136,598 A | 8/1992 | Weller et al. | |
| 5,377,036 A * | 12/1994 | Appel et al. ................ | 359/216.1 |
| 5,384,689 A | 1/1995 | Shen | |
| 5,546,486 A | 8/1996 | Shih et al. | |
| 5,661,829 A | 8/1997 | Zheng | |
| 5,780,806 A | 7/1998 | Ferguson et al. | |
| 6,075,642 A | 6/2000 | Chang | |
| 6,236,146 B1 | 5/2001 | Cramer et al. | |
| 6,278,078 B1 | 8/2001 | Walvoord et al. | |
| 6,335,941 B1 | 1/2002 | Grubb et al. | |
| 6,384,590 B1 | 5/2002 | Kikuchi et al. | |
| 6,407,844 B1 | 6/2002 | Yang et al. | |
| 6,742,694 B2 | 6/2004 | Satoh et al. | |
| 6,747,243 B1 | 6/2004 | Reinhardt | |

(Continued)

FOREIGN PATENT DOCUMENTS

JP       57-100410        6/1982

(Continued)

*Primary Examiner* — Dawayne A Pinkney
(74) *Attorney, Agent, or Firm* — Venable LLP; Michael A. Sartori; Steven J. Schwarz

(57) ABSTRACT

The present invention relates to a light source apparatus or the like provided with a structure that can block reflected return light also when an emitting end side of an optical isolator is a space. The light source apparatus comprises a light source section, a guide section, and an optical module. The optical module includes a collimator, an optical isolator, and an oblique-beam blocking section. The collimator outputs collimated light with a predetermined beam diameter as a forward propagating beam. The optical isolator is a polarization-independent optical isolator that introduces the collimated light from a first end and outputs this collimated light from a second end. The oblique-beam blocking section includes first and second optical components each having a window of a diameter D, and blocks light incident at a predetermined angle relative to an optical axis of the forward propagating beam out of a backward propagating beam, by separating the first and second optical components from each other by a predetermined distance.

4 Claims, 4 Drawing Sheets

U.S. PATENT DOCUMENTS

| | | |
|---|---|---|
| 6,888,853 B1 | 5/2005 | Jurgensen |
| 7,287,312 B2 | 10/2007 | Yamaguchi |
| 2002/0105997 A1* | 8/2002 | Zhang ............................ 372/70 |
| 2003/0224581 A1 | 12/2003 | Lutz et al. |
| 2006/0092994 A1* | 5/2006 | Frankel et al. ................. 372/18 |
| 2006/0204177 A1 | 9/2006 | Singh et al. |
| 2007/0263678 A1 | 11/2007 | Mizuuchi et al. |
| 2008/0013163 A1 | 1/2008 | Leonardo et al. |
| 2008/0053970 A1 | 3/2008 | Nakamae |
| 2008/0170291 A1 | 7/2008 | Nakamae et al. |
| 2009/0224178 A1 | 9/2009 | Champonnois et al. |
| 2009/0272877 A1 | 11/2009 | Tamaoki et al. |

FOREIGN PATENT DOCUMENTS

| | | |
|---|---|---|
| JP | 61-58809 | 12/1986 |
| JP | 1-89884 | 6/1989 |
| JP | 03-136201 | 6/1991 |
| JP | 04-204712 | 7/1992 |
| JP | 05-224151 | 9/1993 |
| JP | 06-077638 A | 3/1994 |
| JP | 07-249654 | 9/1995 |
| JP | 08-148256 | 6/1996 |
| JP | 09-010976 | 1/1997 |
| JP | 09-054283 | 2/1997 |
| JP | 11-354916 | 12/1999 |
| JP | 2000-052069 | 2/2000 |
| JP | 2001-068829 | 3/2001 |
| JP | 2003-205376 | 7/2003 |
| JP | 2003-236685 | 8/2003 |
| JP | 2005-347610 | 12/2005 |
| JP | 2006-305597 | 11/2006 |
| JP | 2008-546535 A | 12/2008 |
| WO | WO-2006/117936 A1 | 11/2006 |

* cited by examiner

LIGHT SOURCE APPARATUS AND OPTICAL MODULE INCLUDED THEREIN

BACKGROUND OF THE INVENTION

1. Field of the Invention

The present invention relates to a light source apparatus that may be utilized in laser processing or the like, and an optical module constituting a part of the light source apparatus.

2. Related Background Art

A light source apparatus (laser processing apparatus) used in laser processing or the like, guides light, which is outputted from a light source section, to an optical module by means of a guide section and emits the light to the outside of the light source apparatus from this optical module (emits light to an object). As the light source section, a laser light source is typically used, and a laser light source including an amplifying optical fiber may be used. In such a light source apparatus, reflected light generated in an object that is irradiated with a laser beam may return to the light source section through the optical module and the guide section. In this case, the light source section may suffer damage. In order to prevent such damage on the light source section, an optical isolator for preventing incidence of the returned light upon the light source section is preferably used.

Usually, the optical isolator is used for a single beam with transverse mode. The isolation in this case is described in Japanese Patent Application Laid-Open No. 05-224151 (Document 1), Japanese Patent Application Laid-Open No. 09-054283 (Document 2), Japanese Patent Application Laid-Open No. 61-058809 (Document 3), and the like. That is, the isolation is defined assuming a case where light from the backward direction (a backward propagating beam) is incident through the same optical path as the optical path through which light incident in the forward direction (a forward propagating beam) propagates after passing through the optical isolator. In this case, as described in above Documents 1 to 3, the backward propagating beam is not terminated inside the optical isolator, but is emitted from the incident end of the optical isolator with shifts in the emission position and emission angle. Just for this reason, the backward propagating beam will not be coupled with the light source that emits the forward propagating beam.

As disclosed in above Document 1, when a birefringent element included in the optical isolator is a plate type, then for the backward propagating beam emitted from the incident end of the optical isolator, only the emission position will vary. However, there is a limitation also on the shift in the emission position due to the birefringence and the like. In the case that a beam with a large mode field diameter or the like is used, the isolation may degrade. In this respect, as disclosed in above Document 2, when the birefringent element included in the optical isolator is wedge-shaped, then for the backward propagating beam emitted from the incident end of the optical isolator, the emission angle also differs from that of the incident beam. Accordingly, even when the mode field diameter is large, the degradation of isolation can be suppressed while the distance between an optical fiber for guiding the forward propagating beam and the optical isolator is secured. However, as described in above Documents 3, there is a limitation also on the birefringence, and the emission angle that enables separation is at most on the order of 1° relative to the optical axis.

SUMMARY OF THE INVENTION

The present inventors have examined the conventional laser processing apparatus, and as a result, have discovered the following problems.

That is, in an emitting optical head or the like of a light source apparatus, both ends of which are not coupled with an optical fiber, the power or energy of the forward propagating beam (incident light) supplied for use in laser processing is also high and it is therefore dangerous to focus the light onto an optical fiber again. In addition, in the emitting optical head, also for the purpose of avoiding the insertion loss, the emission side of an optical isolator is, in most cases, configured so that the forward propagating beam may reach a object to be processed directly through a spatial optical system even when a delivery optical fiber is provided on the incident side of the optical isolator. In the case that the object has a simple planar structure, then even when there is a backward propagating beam, such as reflected light, this backward propagating beam will follow an optical path that coincides with that of the forward propagating beam. In this case, since the backward propagating beam transmits through the optical isolator and thereby changes the position and angle (the emission position and angle on the incident end of the optical isolator), this backward propagating beam is unlikely to re-enter into the delivery optical fiber. However, when the shape of an object is irregular as that of wires is, or when the surface is rugged (there are irregularities therein) although the shape of an object is plate-like, or further when a hole or a groove is produced with processing although the shape of an object is smooth plate-like, it is expected that the backward propagating beam, such as reflected light, will follow a random optical path.

Then, as shown in FIGS. 3B, 3C, the position or angle when the backward propagating beam (reflected light) indicated by a solid line is incident upon the emitting end of an optical isolator 33 will differ from that of the forward propagating beam. In this case, when the backward propagating beam is emitted from the incident end of the optical isolator 33, the backward propagating beam might be accidentally coupled with a delivery optical fiber that is optically connected to the incident end side of the optical isolator 33. Note that, in the view, a dashed line indicates an optical axis AX of the forward propagating beam. In particular, the worst is a case (see FIG. 3C) where a backward propagating beam deviating by an angle θ relative to the optical isolator 33, which separates a normal-incident backward propagating beam with the angle θ (see FIG. 3A), is incident upon a second end (the emitting end of the forward propagating beam). Moreover, even when a separated component of the backward propagating beam emitted from the incident end of the optical isolator 33 does not necessarily coincide with the optical path of the forward propagating beam, the backward propagating beam has a certain degree of mode broadening and therefore a part thereof may couple with the delivery optical fiber.

The present invention has been developed to eliminate the problems described above. It is an object of the present invention to provide an optical module that can block reflected return light (a backward propagating beam) also when the emitting end side of an optical isolator is a space, and a light source apparatus including the same.

A light module according to the present invention has a light incident end for introducing a laser beam as a forward propagating beam, and a light emitting end for emitting this laser beam to an object. In particular, in order to achieve the above-described object, the optical module according to the present invention comprises a collimator, an optical isolator, a first optical component, and a second optical component which are arranged sequentially from the light incident end toward the light emitting end on the optical axis of the forward propagating beam. Note that an oblique-beam blocking section is constituted by the first and second optical components that are arranged while being separated apart from each other by a predetermined distance.

The collimator collimates a laser beam introduced through the light incident end, and outputs the collimated light with a predetermined beam diameter as the forward propagating beam. The optical isolator is a polarization-independent optical isolator including a plurality of birefringent elements. Note that, in the polarization-independent optical isolator, separation of polarized wave components is carried out using a birefringent element positioned on the collimated light incident side while the composition of polarized wave components is carried out using a plurality of birefringent elements positioned on the collimated light emitted side. Moreover, in the case of the polarization-independent optical isolator, the power of emitted light does not depend on the polarization state of incident light. The first and second optical components constituting an oblique-beam blocking section are respectively provided with a window of a diameter D through which light emitted from the second end of the optical isolator passes. This oblique-beam blocking section blocks light, which is incident at a predetermined angle relative to the optical axis of the forward propagating beam, out of a backward propagating beam propagating from the light emitting end toward the light incident end, by separating the first optical component from the second optical component by a predetermined distance.

In the optical module according to the present invention, the first and second optical components are preferably arranged so that the centers of the respective windows may coincide with the optical axis of the forward propagating beam emitted from the second end of the optical isolator. In this case, the first and second optical components are preferably arranged perpendicular to the optical axis of the forward propagating beam, from the viewpoint of simplification of manufacturing operation. However, an arrangement condition is not excluded, in which these first and second optical components are inclined relative to the optical axis of the forward propagating beam. For this reason, in this specification, the diameter D of the window in each of the first and second optical components is defined by a diameter of a projected pattern when opening edges of the respective first and second optical components, the opening edge defining the window, is projected onto a plane perpendicular to the optical axis of the forward propagating beam.

In the optical module according to the present invention, a distance between the first and second optical components is preferably defined as follows. That is, when the emission angle (emission angle of a separated component relative to an optical axis AX of the forward propagating beam) of the backward propagating beam at a first end of the optical isolator is denoted by $\theta$, the backward propagating beam propagating from the light emitting end toward the light incident end, a distance X between the first optical component and the second optical component satisfies the following relation.

$$X > 2D/\tan\theta$$

Furthermore, when the distance between a birefringent element positioned closest to the light emitting end side and a birefringent element positioned closest to the light incident end side among the plurality of birefringent elements is denoted by L, the distance X between the first optical component and the second optical component may satisfy the following relation.

$$X > 2\{D - L\tan(\theta/2)\}/\tan\theta$$

The light source apparatus according to the present invention includes a light source section, a guide section, and a light module (light module according to the present invention) having a structure as described above. The light source section outputs light with a predetermined wavelength. The guide section functions so as to guide the light outputted from the light source section. The optical module receives the light guided by the guide section. In particular, the collimator constituting a part of the optical module collimates the forward propagating beam guided by the guide section and outputs it as collimated light with a predetermined beam diameter.

Note that in the light source apparatus according to the present invention, the light source section preferably includes an amplifying optical fiber.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the scope of the invention will be apparent to those skilled in the art from this detailed description.

DESCRIPTION OF THE PREFERRED EMBODIMENTS

Figure 1:
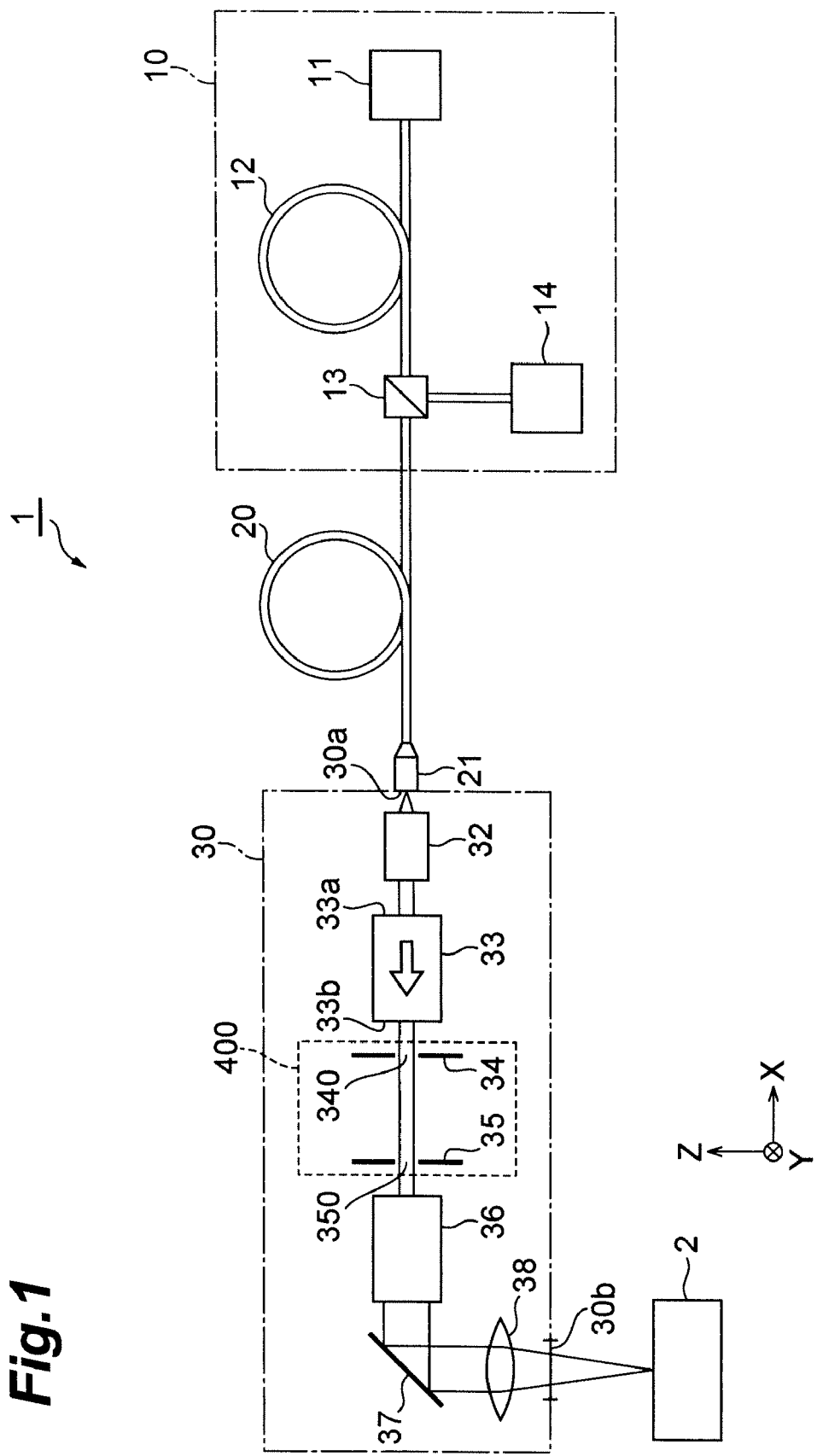
FIG. 1 is a view showing a configuration of an embodiment of a light source apparatus according to the present invention.

In the following, embodiments of a light module and a light source apparatus according to the present invention will be explained in detail with reference to FIGS. 1 and 2A to 4C. In the description of the drawings, identical or corresponding components are designated by the same reference numerals, and overlapping description is omitted.

FIG. 1 is a view showing a configuration of an embodiment of a light source apparatus according to the present invention. In FIG. 1, a light source apparatus 1 comprises a light source section 10, a guide section 20, and an optical module 30, and is applied to a laser processing apparatus that processes an object to be processed 2 by irradiating the object to be processed 2 with a laser beam. The light source section 10 includes a seed light source 11, an amplifying optical fiber 12, an optical coupler 13, and a pumping light source 14. The amplifying optical fiber 12 includes a quartz based optical fiber having a core region extending along a predetermined axis and a cladding region provided on an outer periphery of the core region, wherein this core region is doped with an Yb element. To one end of the amplifying optical fiber 12, pumping light outputted from the pumping light source 14 is supplied through the optical coupler 13 and also seed light outputted from the seed light source 11 is supplied. The supply of the pumping light pumps the Yb element doped in the amplifying optical fiber 12, whereby the seed light is amplified inside the amplifying optical fiber 12. The amplified seed light is outputted from the other end of the amplifying optical fiber 12. The light source section 10 outputs the laser beam amplified by the amplifying optical fiber 12 to the outside through the optical coupler 13.

The guide section 20 is provided between the light source section 10 and the optical module 30, and receives, from one end thereof, a forward propagating beam outputted from the light source section 10, and outputs, through an optical connector 21 provided on the other end, the forward propagating beam that has propagated thereinside. As the guide section 20, a delivery optical fiber is used. The optical module 30 comprises a light incident end 30a and a light emitting end 30b, and includes a collimator 32, an optical isolator 33, a first optical component 34, a second optical component 35, a beam expander 36, a mirror 37, and a lens 38 which are arranged sequentially from the light incident end 30a toward the light emitting end 30b on the optical path of the forward propagating beam. Note that the light incident end 30a of the light module 30 coincides with the emitting end of the optical connector 21 provided on the other end of the guide section 20 (delivery optical fiber). Moreover, an oblique-beam blocking section 400 is constituted by the first and second optical components 34, 35.

That is, the collimator 32 collimates a laser beam outputted from the optical connector 21 and outputs the collimated light with a beam diameter $D_0$ toward the optical isolator 33.

The optical isolator 33 is a polarization-independent optical isolator including a plurality of birefringent elements 300. The optical isolator 33 functions so as to separate two or more polarized wave components in the first end 33a upon which the collimated light, i.e., a forward propagating beam, is incident. At the same time, the optical isolator 33 functions so as to combine two or more polarized wave components in the second end 33b from which this collimated light is emitted. The optical isolator 33 outputs the collimated light, which is emitted from the second end 33b, toward the first optical component 34. The first optical component 34 and the second optical component 35 are provided with windows 340, 350, respectively, through which the collimated light passes, and are arranged while being separated from each other by a predetermined distance on the optical path of the collimated light outputted from the second end 33b of the optical isolator 33. Moreover, the first optical component 34 and the second optical component 35 are arranged, respectively, so that the centers of the windows may coincide with an optical axis AX of the collimated light. The oblique-beam blocking section 400 comprising these first and second optical components 34, 35 blocks light incident at a predetermined angle relative to the optical axis AX of the forward propagating beam out of the backward propagating beam, by adjusting the distance between the first and second optical components 34, 35.

Figure 2A:
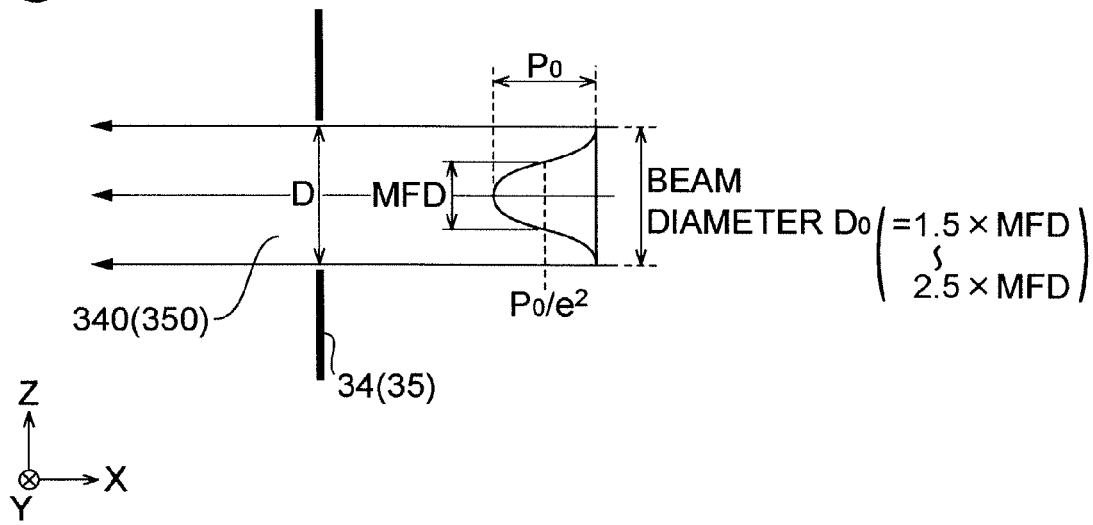
FIGS. 2A and 2B are views for illustrating a relationship among a beam diameter, a mode field diameter, and a diameter of a window in an optical component.

FIG. 2A is a view for illustrating a relationship among the beam diameter $D_0$ of collimated light, a mode field diameter (MFD) of this collimated light, and the diameter D of each of the windows 340, 350 of the first and second optical components 34, 35. As shown in FIG. 2A, since the collimated light is a forward propagating beam having a Gaussian mode distribution as observed in many case examples, the MFD thereof is a diameter at which the intensity of the collimated light becomes $1/e^2$ relative to a center peak $P_O$. Usually, the beam diameter is specified at about 1.5 to 2 times of MFD. Accordingly, also in this embodiment, the beam diameter $D_0$ of the collimated light is set to 1.5 to 2 times of MFD.

Moreover, the window 340 of the first optical component 34 and the window 350 of the second optical component 35, each, will be formed to have such a diameter D that will not degrade the beam quality of the collimated light. Therefore, the diameter D of each of the windows 340, 350 needs to be set to no less than the beam diameter $D_0$. On the other hand, in order to achieve removal of the backward propagating beam by cooperation of these first and second optical components 34, 35, it is not preferable to increase the diameter D of each of the windows 340, 350. Then, in this embodiment, the diameter D of each of the windows 340, 350 is substantially matched with the beam diameter $D_0$ of the collimated light (D=1.5×MFD to 2×MFD).

Figure 2B:
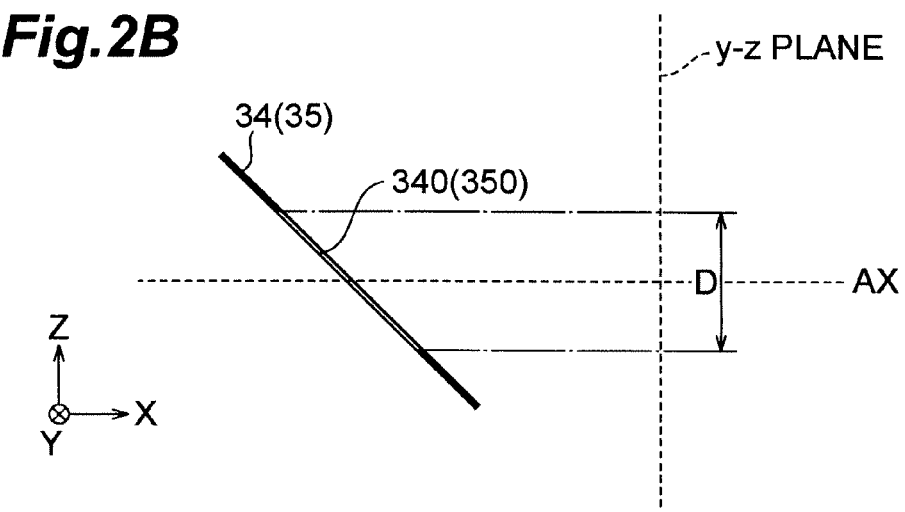

However, the first optical component 34 and the second optical component 35 might be arranged diagonally to the optical axis AX of the collimated light as shown in FIG. 2B. In this case, the diameter D of each of the windows 340, 350 needs to be set larger than the beam diameter D. Accordingly, in this specification, taking into consideration various kinds of installation conditions of the first and second optical components 34, 35 relative to the optical axis AX, the diameter D of each of the windows 340, 350 is defined as a diameter of a projected pattern when the opening edge defining each of the windows 340, 350 is projected onto a y-z plane.

As described above, each of the first optical component 34 and the second optical component 35 is arranged relative to the optical axis AX, and thereby even when a laser beam emitted from the light source section 10 contains high order transverse modes, these high order modes are blocked effectively. Therefore, the output of diffraction-limit can be advantageously obtained.

The beam expander 36 further magnifies the beam diameter of the collimated light (forward propagating beam), which is emitted from the second end 33b of the optical isolator 33 and passed sequentially through the respective windows 340, 350 of the first optical component 34 and the second optical component 35, and outputs the resultant collimated light toward the mirror 37. The mirror 37 reflects a laser beam for processing, which is outputted from the beam expander 36, to the lens 38. Then, the lens 38 condenses the laser beam for processing arriving from the mirror 37, toward the object 2 (emits the laser beam for processing).

In the optical module 30 shown in FIG. 1, in order to prevent reflected light (backward propagating beam) randomly generated in the object 2 from being incident upon the emitting end (the second end 33b) of the optical isolator 33, the first optical component 34 and the second optical component 35 are provided. As for such optical components, two or more optical components may be prepared. These first optical component 34 and second optical component 35 allow only the forward propagating beam to pass therethrough and can block the backward propagating beam.

Note that the respective windows 340, 350 of the first and second optical components 34, 35 are circular holes, and the diameter thereof is about 1.5 to 2 times of MFD of the forward propagating beam, as described above. Moreover, the centers of the respective windows 340, 350 preferably coincide with the optical axis AX of the forward propagating beam. This is because when the diameter D of each of the windows 340, 350 of the first and second optical components 34, 35 is adjusted so as to coincide with MFD (the diameter at which the intensity of the forward propagating beam becomes $1/e^2$ relative to the peak $P_O$) of the forward propagating beam, then not only the power will attenuate but the beam quality of the forward propagating beam will degrade due to the diffraction limit.

Figure 3A:
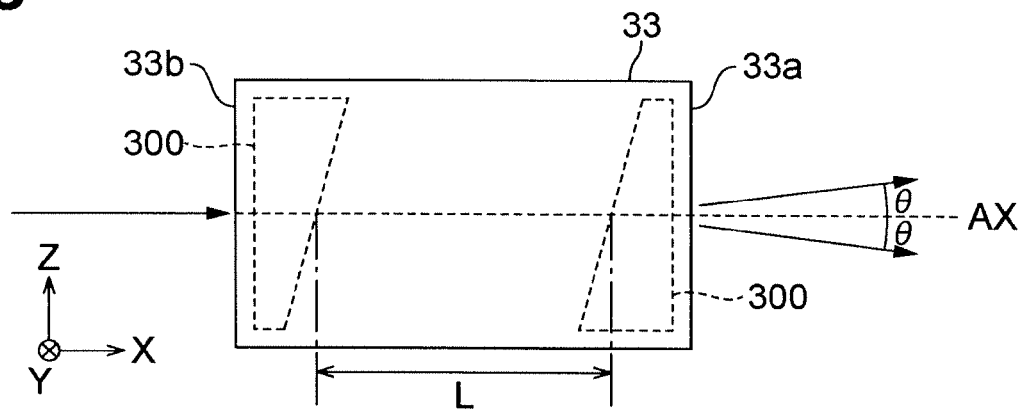
FIGS. 3A to 3C are views for illustrating an emission direction of a backward propagating beam in an optical isolator.
Figure 3B:
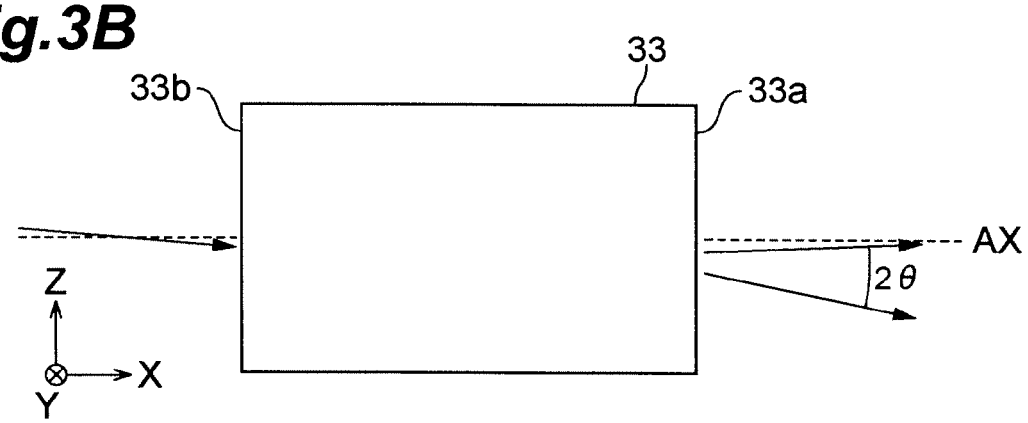
Figure 3C:
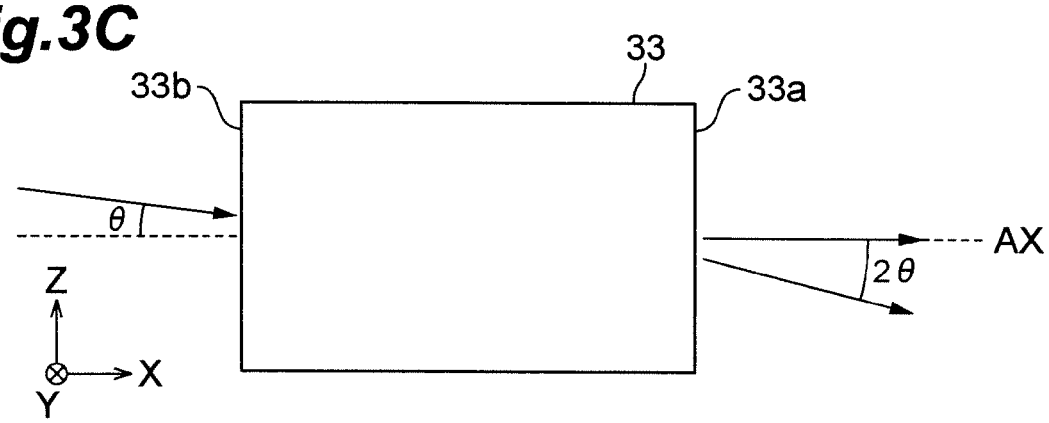

Moreover, the configuration of such an optical component present only on the emitting end (second end 33b) side of the optical isolator 33 might destroy the light source section 10 although it can prevent the backward propagating beam (reflected light) whose optical axis position differs by 2×MFD or more. In other words, a part of the backward propagating beam could enter from the emitting end 33b of the optical isolator 33 and further be coupled with the guide section 20 as shown in FIGS. 3B and 3C. Note that, as shown in FIG. 3A, when the optical axis of the backward propagating beam coincides with the optical axis AX of the forward propagating beam (when the backward propagating beam is normal incident upon the second end 33b), each separated component of the backward propagating beam will have an emission angle of ±θ relative to the optical axis AX, in the first end 33a (incident end of the forward propagating beam) of the optical isolator 33. In this case, by appropriately setting the distance between the optical isolator 33 and the collimator 32 in advance, the incidence of the backward propagating beam upon the collimator 32 may be avoided.

In particular, the configuration of the light source section 10 comprising the amplifying optical fiber 12 might result in damage of the optical fiber or in destruction of the pumping light source 14 and seed light source 11 because the amplifying optical fiber 12 has a high gain. That is, in the case that even the smallest amount of backward propagating beam arriving through the guide section 20 is incident upon the amplifying optical fiber 12, the unwanted backward propagating beam itself will be amplified. Accordingly, when the arrived backward propagating beam propagates some distance through the amplifying optical fiber 12, then the backward propagating beam will obtain a high gain, possibly resulting in damage of the optical fiber or in destruction of the pumping light source 14 and seed light source 11. However, since the polarized wave of the forward propagating beam outputted from the light source section 10 is generally random in the case of the configuration of the light source section 10 comprising the amplifying optical fiber 12, as the optical isolator 33 a polarization-independent optical isolator needs to be used.

In order to block even the smallest amount of backward propagating beam (reflected light) (in order to prevent the backward propagating beam from being coupled with the guide section 20), in the optical module 30 according to this embodiment there are arranged at least two optical components 34, 35 on the emitting end (second end 33b) side of the optical isolator 33.

Figure 4A:
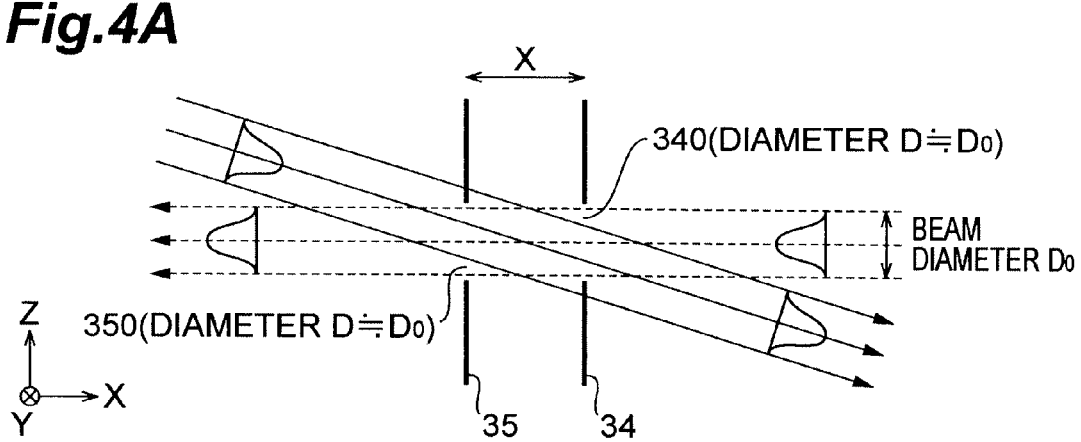
FIGS. 4A to 4C are views for illustrating arrangements of first and second optical components included in the light source apparatus shown in FIG. 1.
Figure 4B:
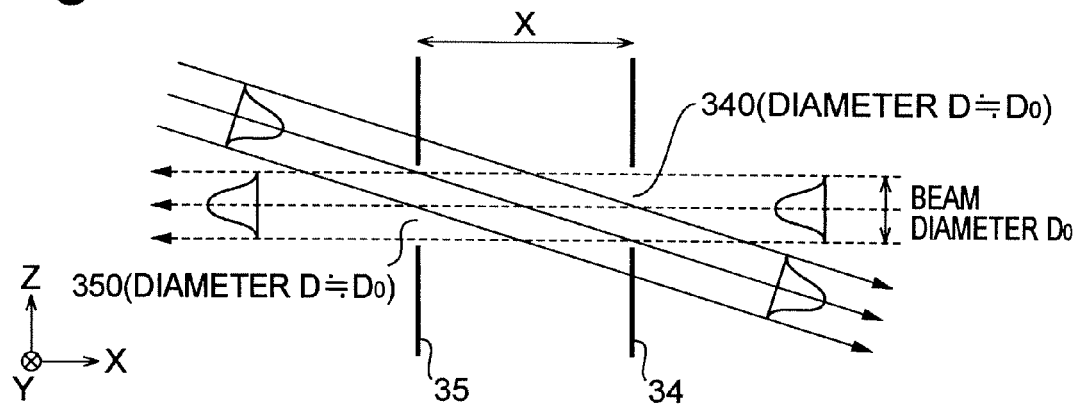
Figure 4C:
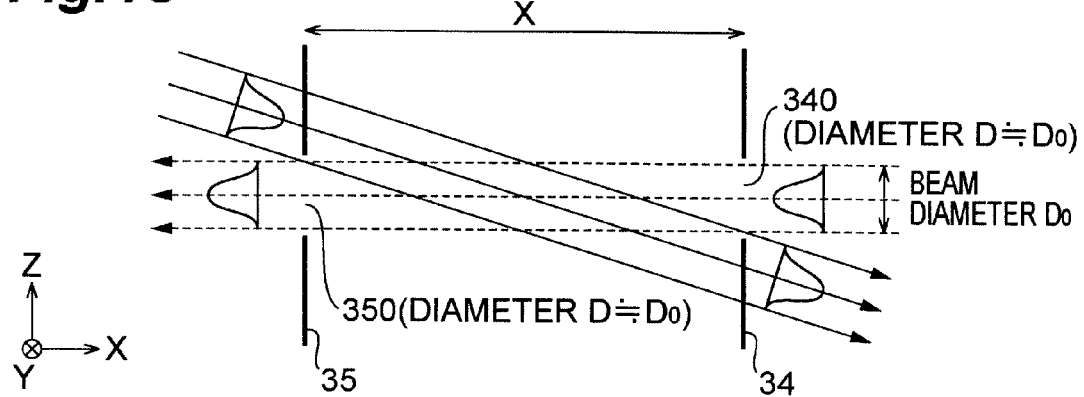

FIGS. 4A to 4C are views for illustrating the arrangement condition of the first and second optical components 34, 35, as the function of the oblique-beam blocking section 400. Note that, in these views, a solid line arrow indicates a backward propagating beam and a dashed line arrow indicates a forward propagating beam. The optical component 34 and the second optical component 35 have the windows 340, 350, respectively, which allow the collimated light to pass therethrough while the collimated light maintains the beam diameter $D_0$, and which also remove the backward propagating beam to be incident upon the second end 33b of the optical isolator 33 with a predetermined angle. When arranged to be perpendicular to the optical axis AX, the respective windows 340, 350 of the first and second optical components 34, 35 are preferably in the circular pattern having the diameter D (=1.5×MFD to 2×MFD) comparable to the beam diameter $D_0$ of the collimated light.

As shown in FIG. 4A, in an arrangement where the distance X between the first optical component 34 and the second optical component 35 is too narrow, it is impossible to completely remove the backward propagating beam (reflected light) having an angle θ relative to the optical axis AX. When the first optical component 34 and the second optical component 35 are arranged as shown in FIG. 4B, it is possible to remove all the components of the backward propagating beam that is coming straight. However, in reality, diffracted light will be generated at an edge portion of each of the windows 340, 350 of the first and second optical components 34, 35. For this reason, also in the arrangement shown in FIG. 4B, there will be still a backward propagating beam component that reaches the optical isolator 33. Preferably, the distance X as shown in FIG. 4C or the distance longer than this X be preferably established. That is, in the case that a separation angle (emission angle of a separated component relative to the optical axis AX of the forward propagating beam) when a normal-incident backward propagating beam upon the second end 33b of the optical isolator 33 is outputted from the first end 33a is denoted by θ, the first optical component 34 and the second optical component 35 are preferably arranged so that the distance X between the first optical component 34 and the second optical component 35 may satisfy Equations (1). Here, D is the diameter of each of the windows 340, 350, which is at least required to allow the forward propagating beam to transmit therethrough without deterioration of the beam quality. Moreover, this D substantially coincides with the beam diameter $D_0$ of the forward propagating beam passing through the windows 340, 350, and is typically about 1.5 to 2 times of MFD of the forward propagating beam.

$$X > 2D/\tan\theta \quad (1)$$

However, strictly speaking, as shown in FIG. 3C, the component of a backward propagating beam, which causes damage by being coupled with the guide section 20, is positioned deviating from the forward propagating beam by $L\tan(\theta/2)$ in the second end 33b (emitting end) of the optical isolator 33. Here, as shown in FIG. 3A, L is the length between a birefringent element positioned closest to the light emitting end 30b side and a birefringent element positioned closest to the light incident end 30a side among the birefringent elements included in the optical isolator 33. Taking this into consideration, the condition of Equation (1) is relaxed as Equation (2) below.

$$X > 2\{D - L\tan(\theta/2)\}/\tan\theta \quad (2)$$

Usually, θ is on the order of 1° as described in above Documents 3. The length of the main body of the optical isolator 33 is 76.4 mm as an example of the commercially available product. Moreover, D is set to 3 mm. Then, the distance X between the first optical component 34 and the second optical component 35 is 34.4 cm when following Equation (1), and is 26.7 cm when following Equation (2).

Note that miniaturization of the optical module 30 is also practically required, of course. However, usually, the optical module 30 needs to incorporate a shutter, a dichroic filter for multiplexing with guiding visible light, and the like. However, in the case of the configuration of these being housed in between the first and second optical components 34, 35, the space efficiency will not be necessarily degraded.

Moreover, it is also contemplated that in place of the first and second optical components 34, 35, the clearance aperture of the optical isolator 33 is narrowed in advance. However, taking into consideration that there are cases where such an optical component is inherently not required such as a case where the object is sometimes an organic compound (e.g., a human body) in which there is no reflected light, it is not advisable to narrow the clearance aperture because the alignment becomes difficult even in this case. An optical axis control method is preferable, in which an optical isolator

What is claimed is:

1. An optical module having a light incident end for introducing a laser beam and a light emitting end for emitting a laser beam to an object, the optical module comprising:
 a collimator collimating a laser beam introduced through the light incident end, and outputting the collimated light with a predetermined beam diameter as a forward propagating beam;
 an optical isolator of polarization-independent type including a plurality of birefringent elements, and having a first end upon which the collimated light outputted from the collimator is incident, and a second end from which the collimated light is outputted, the optical isolator outputting a backward propagating beam, normal incident upon the second end, from the first end by an emission angle $\theta$; and
 an oblique-beam blocking section having a first optical component and a second optical component through which light emitted from the second end of the optical isolator passes, each of the first and second optical component being provided with a window of a diameter D and arranged so that centers of the window thereof coincides with an optical axis of the forward propagating beam outputted from the second end of the optical isolator, the oblique-beam blocking section blocking light incident at a predetermined angle $\theta$ relative to the optical axis of the forward propagating beam out of the backward propagating beam propagating from the light emitting end toward the light incident end, by separating the first optical component from the second optical component by a predetermined distance,
 wherein the diameter D is defined by a diameter of a projected pattern when opening edges of the respective first and second optical components, the opening edge defining the window, is projected onto a plane perpendicular to the optical axis of the forward propagating beam, and
 wherein, when an emission angle of a backward propagating beam at the first end of the optical isolator is denoted by $\theta$, the backward propagating beam being normal incident upon the second end of the optical isolator, a distance X between the first optical component and the second optical component satisfies the following relation:

$$X > 2D/\tan\theta.$$

2. An optical module according to claim 1, wherein, when a distance between a birefringent element positioned closest to the light emitting end side and a birefringent element positioned closest to the light incident end side among the plurality of birefringent elements is denoted by L, the distance X between the first optical component and the second optical component satisfies the following relation:

$$X > 2\{D - L\tan(\theta/2)\}/\tan\theta.$$

3. A light source apparatus, comprising:
 a light source section outputting light with a predetermined wavelength;
 a guide section for guiding the light outputted from the light source section; and
 an optical module according to claim 1 into which the light guided by the guide section is inputted,
 wherein a collimator included in the optical module collimates a forward propagating beam guided by the guide section, and outputs it as collimated light with a predetermined beam diameter.

4. A light source apparatus according to claim 3, wherein the light source section includes an amplifying optical fiber.

* * * * *